United States Patent
Milch et al.

(10) Patent No.: US 9,908,532 B2
(45) Date of Patent: Mar. 6, 2018

(54) METHOD FOR DETERMINING THE ACTIVITY OF A DRIVER OF A MOTOR VEHICLE AND THE ADAPTIVE RESPONSE TIME AND A CORRESPONDING ASSISTANCE SYSTEM

(71) Applicant: VOLKSWAGEN AG, Wolfsburg (DE)

(72) Inventors: Stefan Milch, Hemkenrode (DE); Benjamin Maus, Düsseldorf (DE); Frank Schroven, Wolfenbüttel (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 15/288,004

(22) Filed: Oct. 7, 2016

(65) Prior Publication Data
US 2017/0101107 A1 Apr. 13, 2017

(30) Foreign Application Priority Data
Oct. 8, 2015 (DE) .......................... 10 2015 219 465

(51) Int. Cl.
*B60Q 1/00* (2006.01)
*B60W 40/09* (2012.01)

(52) U.S. Cl.
CPC .......... *B60W 40/09* (2013.01); *B60W 2540/00* (2013.01); *B60W 2540/30* (2013.01); *B60W 2550/308* (2013.01); *B60W 2710/30* (2013.01)

(58) Field of Classification Search
CPC .............. B60W 40/09; B60W 2540/30; B60W 2710/30; B60W 2550/308; B60W 2540/00
See application file for complete search history.

(56) References Cited

U.S. PATENT DOCUMENTS

| | | | |
|---|---|---|---|
| 9,290,174 B1* | 3/2016 | Zagorski | B60K 28/06 |
| 9,481,287 B2* | 11/2016 | Marti | B60Q 1/00 |
| 2005/0251335 A1* | 11/2005 | Ibrahim | B60W 50/14 |
| | | | 701/469 |
| 2007/0080793 A1* | 4/2007 | Blase | B60Q 1/0023 |
| | | | 340/435 |

(Continued)

FOREIGN PATENT DOCUMENTS

| | | |
|---|---|---|
| DE | 10258617 A1 | 4/2004 |
| DE | 102006037015 A1 | 2/2008 |

(Continued)

OTHER PUBLICATIONS

Search Report from German Patent Application No. 10 2015 219 465.5; dated Sep. 12, 2016.

*Primary Examiner* — Erin M File
(74) *Attorney, Agent, or Firm* — Barnes & Thornburg LLP

(57) ABSTRACT

A method for determining an adaptive reaction time of a driver of a motor vehicle, wherein the adaptive reaction time is determined from the activity of the driver by determining the driving behavior of a vehicle driving ahead by a surroundings sensor system, determining activities of the driver of the motor vehicle, determining chronological correlations between the driving behavior of the vehicle driving ahead and the activities of the driver, and determining the driver's activity from the chronological correlations. The method is applied in assistance systems with observation of the surroundings in front of the motor vehicle, in which systems the driver's reaction time is used to determine a warning time.

18 Claims, 3 Drawing Sheets

(56) References Cited

U.S. PATENT DOCUMENTS

| | | | |
|---|---|---|---|
| 2007/0124027 A1* | 5/2007 | Betzitza | B60W 40/02 701/1 |
| 2010/0209890 A1* | 8/2010 | Huang | G09B 9/05 434/65 |
| 2010/0209892 A1* | 8/2010 | Lin | G09B 9/05 434/71 |
| 2012/0035825 A1* | 2/2012 | Morita | B60T 7/22 701/70 |
| 2013/0093888 A1* | 4/2013 | Kim | G08B 21/06 348/148 |
| 2013/0226408 A1* | 8/2013 | Fung | B60W 40/09 701/41 |
| 2015/0005982 A1* | 1/2015 | Muthukumar | B60T 1/10 701/1 |
| 2015/0266455 A1* | 9/2015 | Wilson | G09B 19/10 701/93 |
| 2015/0294547 A1* | 10/2015 | Ito | B60K 28/06 340/576 |
| 2016/0019807 A1* | 1/2016 | Uchida | G09B 9/042 434/65 |
| 2016/0046298 A1* | 2/2016 | DeRuyck | B60W 40/09 340/576 |
| 2016/0358477 A1* | 12/2016 | Ansari | G08G 1/167 |

FOREIGN PATENT DOCUMENTS

| | | |
|---|---|---|
| DE | 102008019519 A1 | 6/2009 |
| DE | 102007060862 A1 | 7/2009 |
| DE | 102010013647 A1 | 2/2011 |
| DE | 102011115878 A1 | 4/2013 |
| DE | 102011055685 A1 | 5/2013 |
| DE | 102012002695 A1 | 8/2013 |
| DE | 102013218280 A1 | 3/2015 |
| EP | 1285842 A2 | 2/2003 |
| JP | 2009093561 A | 4/2009 |

* cited by examiner

METHOD FOR DETERMINING THE ACTIVITY OF A DRIVER OF A MOTOR VEHICLE AND THE ADAPTIVE RESPONSE TIME AND A CORRESPONDING ASSISTANCE SYSTEM

PRIORITY CLAIM

This patent application claims priority to German Patent Application No. 10 2015 219 465.5, filed 8 Oct. 2015, the disclosure of which is incorporated herein by reference in its entirety.

SUMMARY

Illustrative embodiments relate to a method for determining the adaptive reaction time of the driver of a motor vehicle and to a corresponding assistance system.

BRIEF DESCRIPTION OF THE DRAWINGS

The disclosed embodiments will be explained below with reference to the figures. In the drawings.

DETAILED DESCRIPTION

Figure 1:
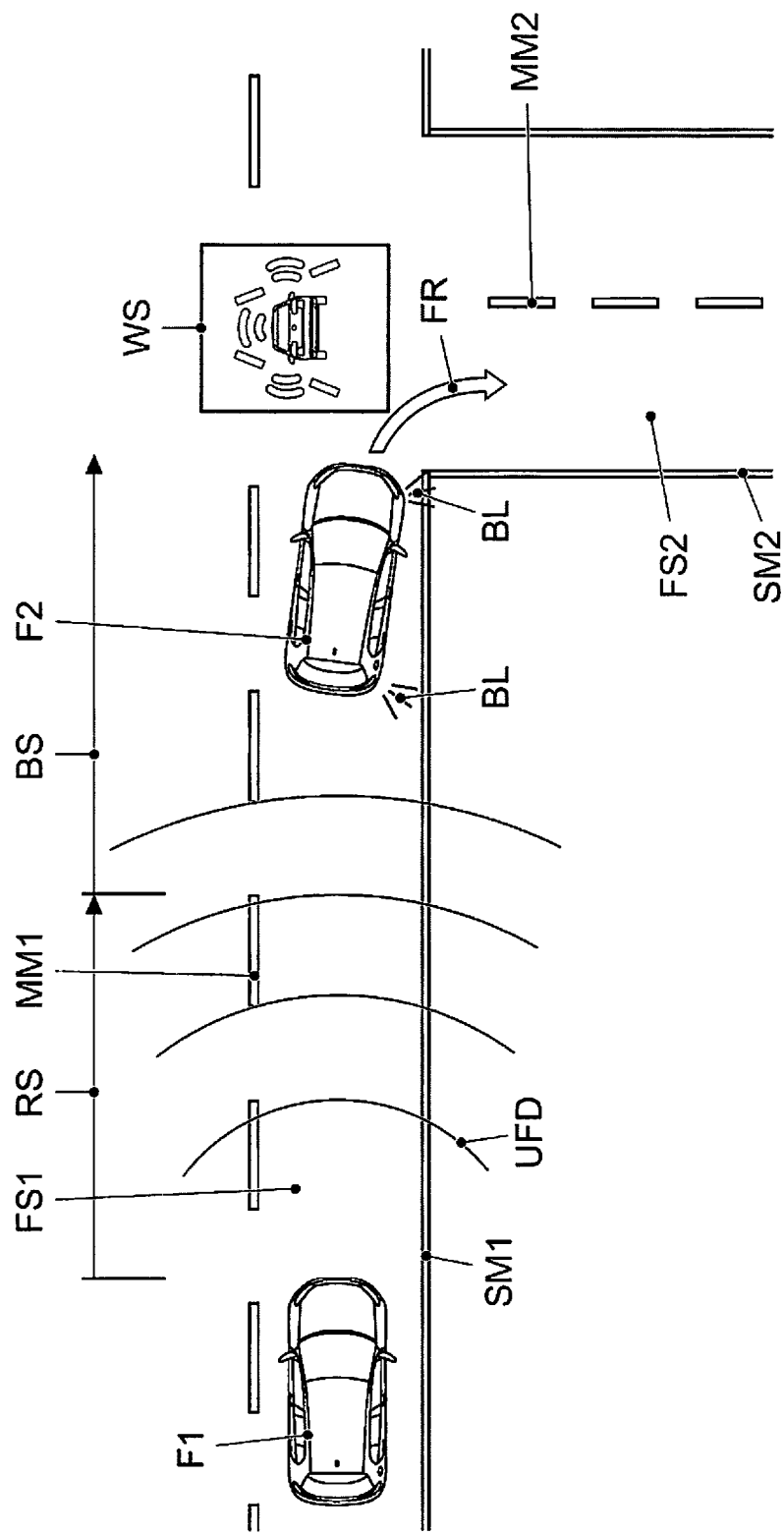
FIG. 1 shows a typical traffic situation with a vehicle which is driving ahead and is turning off the road.

The "front assist" surroundings observation system detects critical distance situations by means of a suitable sensor system such as, for example, radar or laser, and helps to shorten the stopping distance. In hazardous situations, the system warns the driver visually and audibly and operates with a braking jolt, wherein the "front assist" system operates independently of the automatic distance control system ACC.

In this context, the "front assist" system reacts to critical proximity situations in two stages. In the first stage, the assistance system warns the driver with audible and visual signals about vehicles which are suddenly decelerating strongly or are driving slowly ahead and the associated risk of collision. In parallel with this, the vehicle is "prepared" for emergency braking. The brake linings are applied to the brake discs without the vehicle being decelerated. The response behavior of the hydraulic brake assistant is switched to a more sensitive setting.

If the driver does not react to the warning, in the second stage an imminent rear-end collision is indicated by a sudden brief braking jolt and the response behavior of the braking assistant is increased further. If the driver then applies the brakes, the full braking power is available immediately. If the braking operation is not strong enough, "front assist" increases the brake pressure to the necessary amount, so that the vehicle can come to a standstill before the obstacle.

Depending on the vehicle, the "front assist" system can provide two further functions. On the one hand, "front assist" can automatically initiate an automatic partial braking operation after the warning of the collision, which operation is sufficient to brake the vehicle and to restore the driver's attentiveness. On the other hand, in situations in which a collision is unavoidable, the driver is additionally supported with an automatic full braking operation. In this context, "front assist" brakes the vehicle to a maximum extent to reduce the impact speed and to keep the consequences of the collision as minor as possible.

Depending on the vehicle "front assist" can also assist at low speeds. If the driver fails to see an obstacle, "front assist" brakes the vehicle automatically with the city emergency braking operation and ensures that the impact speed is reduced. In an ideal case, rear-end collisions are avoided entirely in this way.

Document DE 10 2011 115 878 A1 presents a method and a device for warning the driver of a motor vehicle about an imminent collision, wherein a warning is output to the driver taking into account a driver's reaction time. In this context, a minimum and a maximum driver's reaction time are predefined, a driver's activity is determined, a current driver's reaction time is determined as a function of the driver's activity, and the driver's reaction time used for the warning is switched over to the current driver's reaction time at the time when a driver's activity is detected, if the current driver's reaction time is shorter than the maximum driver's reaction time, wherein the current driver's reaction time is limited in the downward direction by the minimum driver's reaction time.

Document DE 102 58 617 B4 discloses a method for triggering an autonomous braking process for avoiding a rear-end collision of a vehicle with a vehicle driving ahead, wherein a driver's warning is triggered if a predefined warning condition is satisfied. In this context, the satisfaction of the warning condition indicates that, owing to the relative acceleration of the vehicle forming the instantaneous driving situation and a predefined emergency braking deceleration, the autonomous braking process is to be triggered when a predefined warning time has expired, to bring about a predefined target relative speed or a predefined target safety distance between the vehicle and the vehicle driving ahead. If a driver's activity or a reduction in the risk of a rear-end collision is detected, the warning which has already been triggered can be ended.

Document DE 10 2007 060 862 A1 discloses an emergency brake system for a vehicle having a control unit for controlling the brake system of the vehicle and a surroundings sensor system for making available distance information relating to a vehicle driving ahead, wherein the control unit generates, as a function of the distance information, an at least two-stage driver's warning about an imminent collision. The control unit determines approximately the time period up to the occurrence of a collision with the vehicle driving ahead and compares the determined collision time period with a time period for a lane change, a time period for avoidance of a circular path and an emergency braking period. When the time period for a lane change is undershot, a first warning is output, when the time period for the circular path is undershot a second warning is output, and when the emergency braking time period is undershot a third driver's warning is output, with the result that the driver can intervene actively in the current braking events.

At present, in current "front assist" systems, the attentiveness of a driver is inferred from the intensity of the operator control action by the driver. This leads to a situation in which the "front assist" system often issues a warning when there are vehicles driving ahead which are carrying out a maneuver for turning off the road. For the driver this warning is undesired, since he recognizes that the slowing vehicle turning off the road wishes to leave its lane and he therefore assesses the situation as being uncritical. As a result, he hardly performs any operator control actions, with the result that it is not possible for the system to detect any attentiveness on the part of the driver, and the system therefore infers an inattentive driver, as a result of which the system assumes a high driver's reaction time which is used to determine the warning time. This gives rise to an early warning time which is confusing for the driver.

To be able to better detect the attentiveness of the driver, the driver can be observed to be able to detect the driver's attentiveness from his head posterior, for example. However, this requires additional sensor systems in the vehicle and increases costs.

Thus, disclosed embodiments avoid superfluous warnings to the driver and of improving the determination of adaptive driver's reaction times in assistance systems having a surroundings monitoring feature such as, for example, the "front assist" surroundings observation system.

At least one disclosed method determines an adaptive reaction time of a driver of a motor vehicle, wherein the adaptive reaction time is determined from the activity of the driver. That method comprises the following operations: determining the driving behavior of a vehicle driving ahead by means of a surroundings sensor system, determining activities of the driver of the motor vehicle, determining chronological correlations between the driving behavior of the vehicle driving ahead and the activities of the driver, and determining the driver's activity from the chronological correlations.

In this way, it is possible to determine the driver's activity by acquiring the correlation between the driving behavior of the vehicle driving ahead and operator control actions of the driver correlated therewith as a reaction to the driving behavior of the vehicle in front. Therefore, even relatively less intensive operator control actions of the driver can be used to assess the driver's activity.

The driving behavior of the vehicle in front may also be determined on the basis of the deceleration of the vehicle in front. This is a parameter which can easily be detected by means of a suitable sensor system and which characterizes the slowing down of the vehicle which is turning off from the road during a maneuver in which it is turning off from the road. The behavior of the driver may be determined on the basis of the activation of the accelerator pedal and the activation of the brake. These are the operator control actions which the attentive driver carries out if the vehicle driving ahead slows down to turn off the road. It is possible to detect whether the driver is attentive or not by means of the determination of the chronological correlation between the parameter, which is also referred to as a maneuver attribute, and the specified operator control actions.

The chronological correlation between a deceleration of the vehicle driving ahead and the driver's reactions "take foot off accelerator pedal" and "apply brakes" and the correlation between a reduction in the deceleration of the vehicle driving ahead and the driver's reactions "accelerate" and "release brakes" may also be determined. This correlation describes the reaction of the driver to the exiting of the vehicle driving ahead from the current roadway as a result of the maneuver of turning off the road, which is used by the driver of the motor vehicle for acceleration, for example, to reach the previous speed again.

The driver's activity may be represented by a value of a predefined closed interval, for instance, of the interval [0, 1]. In other words, the driver's activity is mapped onto a concluded interval in which one interval limit represents an inactive driver, and the other interval limit represents an active driver. Values between the two represent a driver with an activity between the two limiting values. The interval [0, 1] consequently represents a standardized probability measure of the driver's activity.

In at least another method for determining an adaptive reaction time of a driver of a motor vehicle which is determined from the activity of the driver, a first vehicle-specific driver's activity is determined from the intensity on the basis of the operator control actions performed by the driver in the motor vehicle, a second correlated driver's activity, which reflects the chronological correlations between the behavior of a vehicle driving ahead and reactions of the driver caused thereby, is determined by the first method described above, and logical linking of the two determined driver's activities is used to determine the adaptive driver's reaction time.

In this way, the determination of the driver's activity from the intensity of the operator control actions by the driver is logically linked to the determination of the driver's activity from the chronological correlation of actions by the driver with the behavior of the vehicle driving ahead, to obtain a driver's activity which is close to reality.

The logical linking may be formed by the formation of the minimum value of the two determined driver's activities, i.e., the vehicle-specific driver's activity and the correlated driver's activity.

As a result of the formation of minimum values, an active driver can also be detected on the basis of small operator control actions and a realistic driver's reaction time can be determined.

At least the steering wheel angle speed, the lateral acceleration, the flashing indicator light status, the accelerator pedal gradient and the longitudinal acceleration may be possible as parameters which represent the operator control actions of the driver.

In accordance with at least one disclosed assistance system for predictively monitoring the surroundings of a motor vehicle, the assistance system is configured and designed to carry out the above second method. The system may comprise a device for sensing the surroundings in front of the motor vehicle, a device for determining the driving behavior of a vehicle driving ahead from the surroundings data, a device for determining operator control actions of the driver in the motor vehicle, a module for determining the vehicle-specific driver's activity, a module for determining the correlated driver's activity from the interaction between the vehicle driving ahead and reactions of the driver, a device for determining a resulting driver's activity from the vehicle-specific driver's activity and the correlated driver's activity, a device for determining a driver's reaction time from the resulting driver's activity, and a device for generating a warning to the driver as a function of the driver's reaction time and the distance from the vehicle driving ahead.

For example, the "front assist" surroundings observation system described at the beginning is possible as an assistance system which initiates warning signals in a two-stage state and, if appropriate, emergency braking, wherein the adaptive driver's reaction time which is determined is included in the execution of the assistance system.

FIG. 1 shows a typical situation in which a vehicle is turning off a road, in which a vehicle F2 which is driving ahead at a distance in front of a vehicle F1 in question and turns off the road from a first lane FS1 to the right into a second lane FS2 at a junction with the second lane FS2, wherein the lanes FS1 and FS2 are bounded by center markings MM1 and MM2 as well as by edge markings SM1 and SM2. The intention of the vehicle F2 which is driving ahead to turn off the road is displayed by the activated flashing indicator lights BL and the turning-off direction is indicated by the direction arrow FR.

The vehicle F1 in question which follows the vehicle F2 which is turning off the road has a "front assist" system which detects the vehicle F2 which is driving ahead by means of a surroundings sensor system, for example, a radar system, which is directed in the direction of travel. The radar system is illustrated schematically in FIG. 1 by a series of emitted surroundings detection pulses UFD.

Two distances are also shown in FIG. 1. The reaction distance RS constitutes the time of the unchanged travel when a driver's reaction time is assumed. In other words, for a current driving situation the "front assist" system assumes a driver's reaction time which is predefined for this driving situation. This assumed driver's reaction time determines the "front assist" system usually from the driver's activity of the driver, that is to say the operation of the accelerator pedal, of the brake and/or of the steering wheel, since such systems do not carry out any direct driver observations such as, for example, by means of a camera.

The reaction distance RS which is covered by the assumed driver's reaction time is adjoined by a braking distance BS which the driver would require to avoid a collision with the vehicle F2 driving ahead by means of comfort braking. In this context, the assistance system calculates the future distance between the two vehicles taking into account the speed and the deceleration or acceleration of the vehicle F2 driving ahead. If there is a resulting risk of collision, the assistance system outputs a warning which is represented as a warning symbol WS in FIG. 1.

In the currently disclosed implementation, the assistance system does not detect whether the vehicle F2 driving ahead is turning off the road or not. Consequently, the assistance system treats the vehicle F2 driving ahead as an obstacle which drives ahead at a decreasing speed and with which the vehicle F1 will have a rear-end collision. Since the attentive driver detects the intention of the vehicle driving ahead to turn off the road on the basis of the traffic situation and the activated flashing indicator light BL, the driver's activity which is communicated to the assistance system is small, since the driver usually only takes his foot slightly off the accelerator pedal, possibly behaves as if ready for braking and does not present any steering activity. From these minimum driving activities the assistance system then infers an essentially inactive or inattentive driver and assumes a long reaction time. As a result, an early warning, illustrated by the warning signal WS in FIG. 1, is output to the driver of the vehicle F1 in question, since the warning time has to be selected so that the driver is still able, after the warning, to alleviate the hazardous situation by an operator control action such as, for example, braking or steering.

Such early warning which results from the supposed inactivity of the driver is, of course, superfluous for the attentive driver, since the driver recognizes the intention of the vehicle F2 driving ahead to turn off the road and reacts suitably to the behavior of the vehicle F2 in front by usually taking his foot off the accelerator pedal and, if appropriate, slightly braking. To avoid unnecessarily early outputting of a warning signal WS, the assistance system is therefore geared to an interaction between the behavior of the vehicle driving ahead, measured by the surroundings sensor system UFD, and the driving behavior. By virtue of the fact that the behavior of the assistance system takes into account the reaction of the driver of the vehicle F1 in question to the behavior of the vehicle driving ahead, unnecessary warning signals can be avoided, since, as it were, the turning off behavior of the vehicle driving ahead is "recognized".

Figure 2:
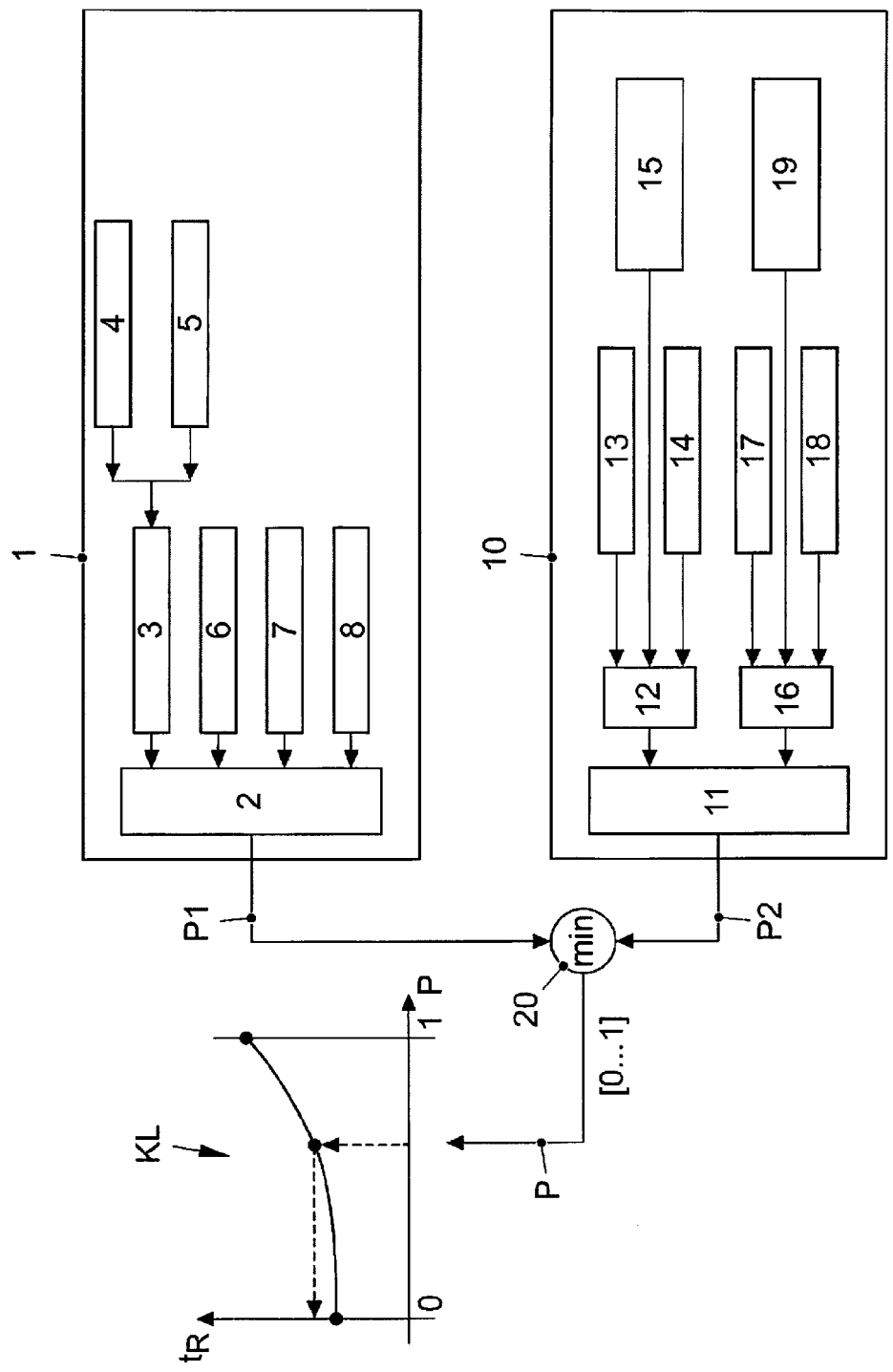
FIG. 2 shows the method for adapting the reaction time of the assistance system.

FIG. 2 shows, in a schematic illustration, the method for determining an adaptive reaction time of the driver which is implemented in a "front assist" assistance system with a turning-off function. In this context, the method of the system comprises a first module 1 for determining a driver's activity which is specific to the vehicle in question and a second module 10 for determining the interaction between the vehicle driving ahead and the driver's reaction. In other words, the second module 10 determines the correlation between the driving behavior of a vehicle F2 driving ahead and the resulting reaction of the driver of the vehicle F1 in question, as is illustrated schematically in FIG. 1.

In the first module 1 for determining the driver's activity which is specific to the vehicle in question, a first passively level P1 is determined which reflects the activity of the driver, wherein this passivity level P1 is determined on the basis of vehicle-specific parameters. In the second module 10, a second passivity level P2 is determined which determines the driver's activity of the driver on the basis of the interaction between the behavior of the vehicle F2 driving ahead and the reactions of the driver of the vehicle F1 in question which are correlated therewith. The values of the two passivity levels P1 and P2 are elements of the concluded interval [0, 1], wherein a passivity level of "1" means that the driver is inactive, and a passivity level of "0" reflects an active driver. Instead of the passivity level used here in the example, a driver's activity level could be defined in the same way, with the driver being assumed to be active in the case of a value of "1".

The two determined passivity levels P1, P2 are logically linked to one another in a device 20, wherein the logical linking is implemented by the formation of the minimum value of the two passivity levels P1, P2, and the resulting passivity level P is used to determine the adaptive driver's reaction time. Therefore the following applies:

$$P=\min(P1,P2); P,P1,P2 \in [0,1]$$

The resulting passivity level P, which is also defined at the concluded interval [0, 1] is converted into a corresponding driver's reaction time tR by means of a characteristic curve KL. This characteristic curve KL, which represents the relationship between a driver's passivity level and a driver's reaction time can be determined, for example, using suitable tests. As is also apparent from the characteristic curves KL, a long driver's reaction time is assigned to an inactive driver in the passivity level P=1, while a short driver's reaction time corresponds to a passivity value P=0. The profile of the characteristic curve KL between the values P=0 and P=1 is usually not linear.

The determination of the vehicle-side passivity level P1 in the module 1, which passivity level P1 represents the vehicle-specific driver's activity, is carried out by means of the analysis of various parameters which reflect the activity of the driver. The lateral stability 3 of the vehicle is determined by means of the parameters of the steering wheel speed 4 and lateral acceleration 5 which are determined by the corresponding vehicle sensors. By means of the lateral stability 3 and the parameter of the flashing indicator lights 6, accelerator pedal gradient 7 and longitudinal acceleration 8, the driver's activity is determined in the block 2 and converted into a vehicle-side passivity variable P1 with the value range [0, 1] and output. In other words, if the flashing indicator light 6 is set, for example, the accelerator pedal gradient is high and/or the longitudinal acceleration is high, an active driver is inferred and the passivity level P1 is set to the value zero. If, on the other hand, the steering wheel angle speed 4 and the lateral acceleration 5 are low, the flashing indicator light 6 is not set, the accelerator pedal gradient 7 is low or zero and/or the longitudinal accelerator 8 is also low or zero, this indicates an inactive driver with a corresponding passivity value P1=1. Expressed in general terms, the attentiveness of the driver is inferred from the intensity of his operator control actions.

As is apparent from the above description of the module 1 with respect to the determination of the driver's activity which is specific to the vehicle in question, in the event of a maneuver for turning off the road of a vehicle F2 driving ahead this module 1 comes to the conclusion, owing to the small change in the steering wheel angle speed 4 and the lateral acceleration 5 as well as a small accelerator pedal gradient 7 and a low longitudinal acceleration 8 or low braking, that the driver is probably inactive, which, however, does not necessarily actually have to apply to this case of turning off the road by the vehicle F2 driving ahead.

To be able to check or correct this possible incorrect assessment of the driver's activity of the module 1 to determine the driver's activity which is specific to the vehicle in question, in the second module 10 the correlation between the behavior of the vehicle F2 in front and a reaction of the driver of the vehicle F1 in question which reflects this behavior is examined.

The module 10 therefore comprises a correlation unit 12 which detects the chronological correlation between the deceleration of the vehicle in front and the driver's reaction, wherein the parameters "deceleration of the vehicle in front" 15, "driver's reaction take foot off accelerator pedal" 13 and "driver's reaction apply brakes" 14 are used as input parameters. In this context, the parameter 15 "deceleration of the vehicle in front" is made available by the detection of the surroundings by the "front assist" assistance system, while the parameters "take foot off accelerator pedal" 13 and "apply brakes" 14 are made available by sensors of the vehicle F1 in question.

The module 10 also comprises a further correlation unit 16 which brings about the chronological correlation between a reduction in the deceleration of the vehicle in front F2 and a driver's reaction caused thereby. Input variables for this further correlation unit 16 are, at the vehicle F2 in front the parameter 19 "reducing the deceleration of the vehicle in front" and the possible driver's reactions "accelerate" 17 and "release brakes" 18 in the vehicle F1 in question.

The results of the two correlation units 12, 16 are fed to a device for determining 11 the correlated driver's activity of the driver of the vehicle F1 in question, which device outputs as a result the second passivity level parameter P2 of the driver, wherein this second passivity level parameter P2 reflects the correlated driver's activity on the basis of the reaction of the driver to the vehicle in front F2 which is turning off the road.

Therefore, for the vehicle driving ahead maneuver attributes such as, for example: "starts deceleration", "amplifies deceleration" or "reduction in deceleration" are determined in the further module 10, and it is analyzed whether an adequate reaction of the driver takes place in a chronologically correlated state. An adequate reaction to the maneuver attribute "starts deceleration" is, for example, a reduction in the pressure on the accelerator pedal or an increase in the brake pressure by the driver. As a result of the required chronological correlation, driver's actions with low intensity, such as frequently occur in the case of a vehicle which is driving ahead and is turning off the road, can also be used to determine a suitable adaptive driver's reaction time.

As a result of the formation of minimum values from the two determined passivity levels P1, P2, in the event of a vehicle in front which is turning off the road, the result of the module 10, which determines the interaction between the vehicle driving ahead and the driver, can be used as a driver's activity for determining the driver's reaction time, with the result that the incorrect assessment of the first module 1 with respect to the activity of the driver of the vehicle in question is not taken into account.

Figure 3:
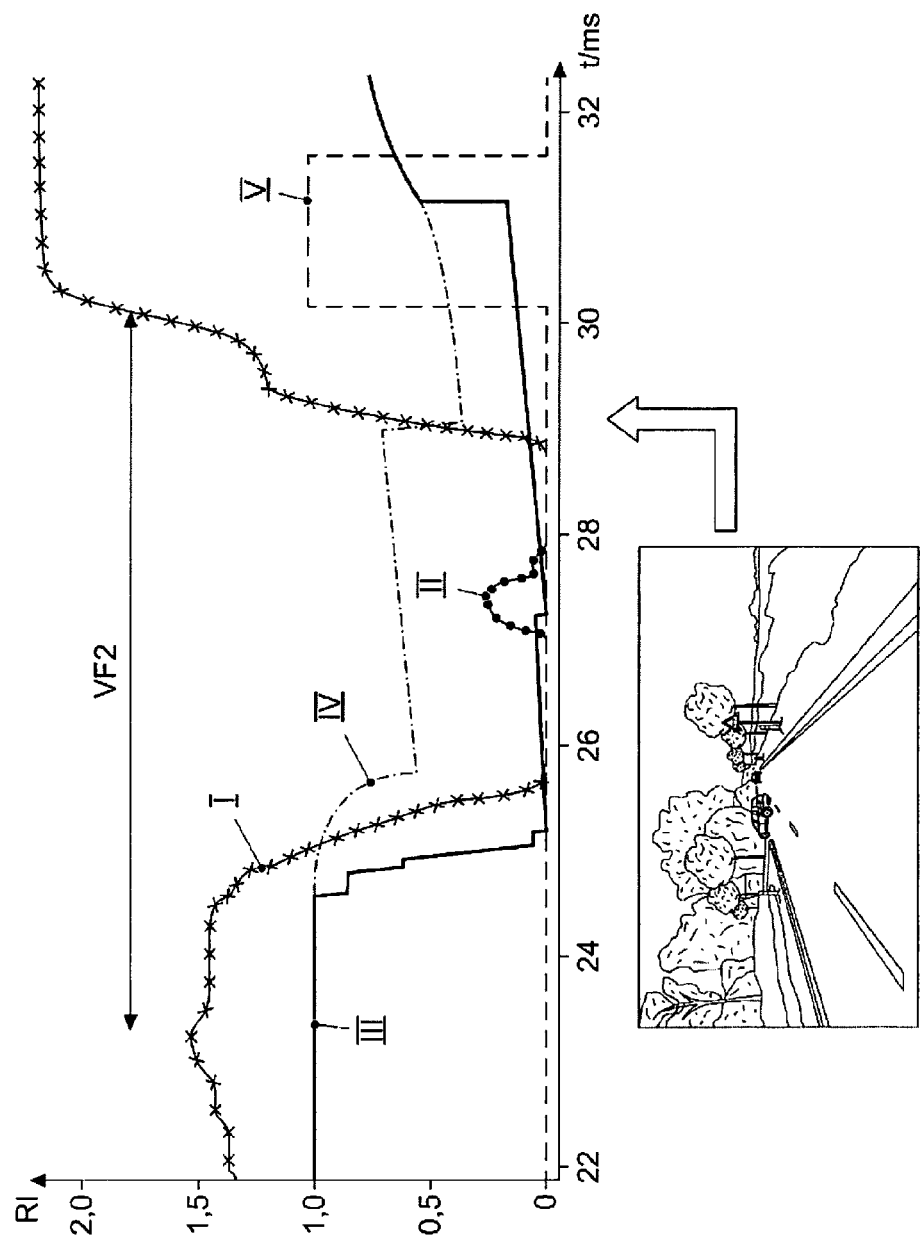
FIG. 3 shows an explanation of the method on the basis of the chronological sequence of an example.

FIG. 3 shows an example of a maneuver for turning off the road by a vehicle which is driving ahead, wherein in the lower part of the figure an image of the traffic situation can be seen, while in the upper part this maneuver for turning off the road is illustrated from the point of view of the vehicle in question with chronological resolution on the basis of suitable parameters, wherein the parameters which are represented in the curves are not to be evaluated quantitatively but rather serve the purpose of explanation.

In the lower part of FIG. 3, a vehicle which is driving ahead on a two-lane road, and which turns off to the left and therefore leaves the current road, can be seen from the point of view of the vehicle F1 in question.

This maneuver and the behavior of the "front assist" assistance system can be seen with chronological resolution in the graphic located above. During the indicated time period VF2, the "front assist" surroundings observation system detects a deceleration of the vehicle F2 which is driving ahead and which occurs at approximately t=23 ms and is ended at t=30 ms. At the start of the illustration, that is to say at t=22 ms, no deceleration of the vehicle F2 which is driving ahead has taken place and the position of the accelerator pedal which is represented by the curve I indicates a variable which is sufficient to maintain the speed of the vehicle in question. The sensitivity of the assistance system, that is to say the passivity P of the driver, which is represented by the curve III, is at the value P=1 at this time, since owing to a lack of accelerator pedal gradient and a lack of steering movement both the first and the second modules signal an inactive driver to the system.

Shortly after the start of the deceleration of the vehicle in front, the driver takes his foot off the accelerator pedal at approximately t=25 ms, which can be seen from the curve I. As a consequence of this, the influence of the module 10 becomes apparent and the sensitivity/passivity level drops to the value zero. The curve IV represents the profile of the passivity level P1 of the module 1, which passivity level P1 also actually drops slightly and reaches the value 0.5 at approximately t=26 ms. This drop is brought about by the small accelerator pedal gradient 7 of the module 1 in FIG. 2. The overall sensitivity or the resulting passivity level P of the curve 3 continues to rise slightly near to the value "0" and is pushed toward the value "0" by the slight braking maneuver represented by the curve II. Although the deceleration phase VF2 of the vehicle in front is chronologically not yet ended, the driver activates the accelerator pedal again at approximately t=29 ms, since the driver has recognized that the vehicle in front has almost ended the maneuver for turning off the road. In other words, to recover the vehicle speed, the driver activates the accelerator pedal to keep the pressure on the accelerator pedal constant again at slightly above t=30 ms. Consequently, at approximately t=31 ms the sensitivity/resulting passivity level rises again slightly.

If the chronological correlation between the behavior of the vehicle F2 in front and the reaction of the driver is not taken into account, according to the curve IV, which only represents the passivity level P1 which is specific to the vehicle in question, the passivity level P1 which is specific to the vehicle in question would, as a result of the operator control of the accelerator pedal, indeed have a value of less than "0.5", but this would still lead to a situation in which a warning signal V would be output at a time value of slightly greater than t=30 ms. This warning signal would be completely meaningless to the driver, since the deceleration phase VF2 of the vehicle in front is ended; in other words the vehicle in front would have left the road lying ahead as a result of a maneuver for turning off the road.

As a result of taking into account the interaction between the behavior of the vehicle in front F2 and the driver's reaction, the module 10 suppresses unnecessary warnings in the event of a maneuver for turning off the road by a vehicle F2 which is driving ahead.

LIST OF REFERENCE SYMBOLS

F1 Vehicle in question
F2 Vehicle which is turning off the road
FS1 Lane 1
FS2 Lane 2
FR Direction of travel
MM1 Center marking lane 1
MM2 Center marking lane 2
SM1 Edge marking
SM2 Edge marking
BL Flashing indicator light
RS Reaction distance
BS Braking distance
UFD Detection of the surroundings/radar
WS Warning symbol
1 Module for driver's activity specific to the vehicle in question
2 Determination of passivity levels specific to the vehicle in question
3 Determination of the lateral stability
4 Steering wheel angle speed
5 Lateral acceleration
6 Flashing indicator light
7 Accelerator pedal gradient
8 Longitudinal acceleration
10 Module for correlated driver's activity from the interaction between vehicle driving ahead and driver's reaction
11 Determination of correlated driver's activity
12 Correlation between deceleration of vehicle in front and driver's reaction
13 Driver's reaction: take foot off accelerator pedal
14 Driver's reaction: brake slightly
15 Deceleration of vehicle in front
16 Correlation between reduction in deceleration of vehicle in front and driver's reaction
17 Driver's reaction: accelerate
18 Driver's reaction: release brakes
19 Reduction in deceleration of vehicle in front
20 Formation of minimum values
P1 Passivity level 1
P2 Passivity level 2
P Resulting passivity level
$t_R$ Reaction time of driver
KL Characteristic curve
VF2 Deceleration of vehicle in front
I Position of accelerator pedal
II Activation of brakes
III Sensitivity
IV Sensitivity without interaction between vehicle in front and driver's reaction
V Warning without interaction
t Time

The invention claimed is:

1. A method for determining an adaptive reaction time of a driver of a motor vehicle based on an activity of the driver as part of predictive monitoring of surroundings of the motor vehicle by an assistance system, the method comprising:
sensing the surroundings in front of the motor vehicle by a surrounding sensor system;
determining the driving behavior of the vehicle driving ahead of the driver's motor vehicle using the surroundings sensor system;
determining operator control actions of the driver in the motor vehicle;
determining a vehicle-specific driver's activity;
determining a correlated driver's activity from the interaction between the vehicle driving ahead and reactions of the driver;
determining whether the driver is active based on the vehicle-specific driver's activity and the correlated driver's activity;
determining a driver's reaction time from the resulting driver's activity, wherein the driver's reaction time varies based on reactions of the driver; and
generating a warning to the driver as a function of the driver's reaction time and a distance from the vehicle driving ahead.

2. The method of claim 1, wherein the driving behavior of the vehicle in front of the driver's vehicle is determined based on deceleration of the vehicle in front of the driver's vehicle.

3. The method of claim 1, wherein the activities of the driver is determined based on activation of the accelerator pedal and the activation of the brake.

4. The method of claim 1, wherein determining a correlated driver's activity includes determining correlations between a deceleration of the vehicle driving ahead and reactive activities of the driver regarding deactivation of an accelerator pedal or activation of a brake petal of the driver's motor vehicle, and correlations between a reduction in the deceleration of the vehicle driving ahead and reactive activities of the driver regarding activation of the accelerator pedal.

5. The method of claim 1, wherein the determination of whether the driver is active is represented by a value of a predefined closed interval.

6. A method for determining an adaptive reaction time of a driver of a motor vehicle based on an activity of the driver as part of predictive monitoring of surroundings of the motor vehicle by an assistance system, the method comprising:
sensing the surroundings in front of the motor vehicle by a surrounding sensor system;
determining the driving behavior of the vehicle driving ahead of the driver's motor vehicle using the surroundings sensor system;
determining a vehicle-specific driver's activity;
determining a correlated driver's activity from the interaction between the vehicle driving ahead and reactions of the driver;
determining whether the driver is active based on the vehicle-specific driver's activity and the correlated driver's activity;
determining a driver's reaction time from the resulting driver's activity, wherein the driver's reaction time varies based on reactions of the driver; and
generating a warning to the driver as a function of the driver's reaction time and a distance from the vehicle driving ahead.

7. The method of claim 6, wherein as part of the determination of the driver's adaptive reaction time, two determined driver's activities are logically linked, and the logical linking is determined based on formation of a minimum value of the two determined driver's activities.

8. The method of claim 6, wherein parameters which represent the operator control actions of the driver comprise at least steering wheel angle speed, lateral acceleration, flashing indicator light status, accelerator pedal gradient and longitudinal acceleration.

9. The method of claim 6, wherein the determining of at least one correlated driver's activity comprises determining an adaptive reaction time of the driver of the motor vehicle, wherein the adaptive reaction time is determined based on the activity of the driver by:
determining driving behavior of a vehicle driving ahead of the driver's motor vehicle using a surroundings sensor system;
determining activities of the driver of the motor vehicle;
determining chronological correlations between the driving behavior of the vehicle driving ahead of the driver's motor vehicle and the activities of the driver of the motor vehicle; and
determining whether the driver is active based on the chronological correlations.

10. The method of claim 9, wherein the driving behavior of the vehicle in front of the driver's vehicle is determined based on deceleration of the vehicle in front of the driver's vehicle.

11. The method of claim 9, wherein the activities of the driver is determined based on activation of the accelerator pedal and the activation of the brake.

12. The method of claim 9, wherein determining chronological correlations includes determining correlations between a deceleration of the vehicle driving ahead and reactive activities of the driver regarding deactivation of an accelerator pedal or activation of a brake petal of the driver's motor vehicle, and correlations between a reduction in the deceleration of the vehicle driving ahead and reactive activities of the driver regarding activation of the accelerator pedal.

13. The method of claim 9, wherein the determination of whether the driver is active is represented by a value of a predefined closed interval.

14. An assistance system to predicatively monitor the surroundings of a motor vehicle, wherein the assistance system is configured to determine an adaptive reaction time of a driver of the motor vehicle based on an activity of the driver, the assistance system comprising:
a device to sense the surroundings in front of the motor vehicle;
a device to determine the driving behavior of a vehicle driving ahead from the surroundings data;
a device to determine operator control actions of the driver in the motor vehicle;
a module to determine a vehicle-specific driver's activity;
a module to determine a correlated driver's activity from the interaction between the vehicle driving ahead and reactions of the driver;
a device to determine whether the driver is active based on the vehicle-specific driver's activity and the correlated driver's activity;
a device to determine a driver's reaction time from the resulting driver's activity, wherein the driver's reaction time varies based on reactions of the driver; and
a device to generate a warning to the driver as a function of the driver's reaction time and a distance from the vehicle driving ahead.

15. The system of claim 14, wherein the driving behavior of the vehicle in front of the driver's vehicle is determined based on deceleration of the vehicle in front of the driver's vehicle.

16. The system of claim 14, wherein the vehicle-specific driver's activity is determined based on activation of the accelerator pedal and the activation of the brake.

17. The system of claim 14, wherein to determine correlated driver's activity includes to determine correlations between a deceleration of the vehicle driving ahead and reactive activities of the driver regarding deactivation of an accelerator pedal or activation of a brake petal of the driver's motor vehicle, and to determine correlations between a reduction in the deceleration of the vehicle driving ahead and reactive activities of the driver regarding activation of the accelerator pedal.

18. The system of claim 14, wherein the driver's activity is represented by a value of a predefined closed interval.

* * * * *